Feb. 9, 1926.
R. E. BOOKER
MINING MACHINE
Filed Jan. 11, 1922
1,572,066
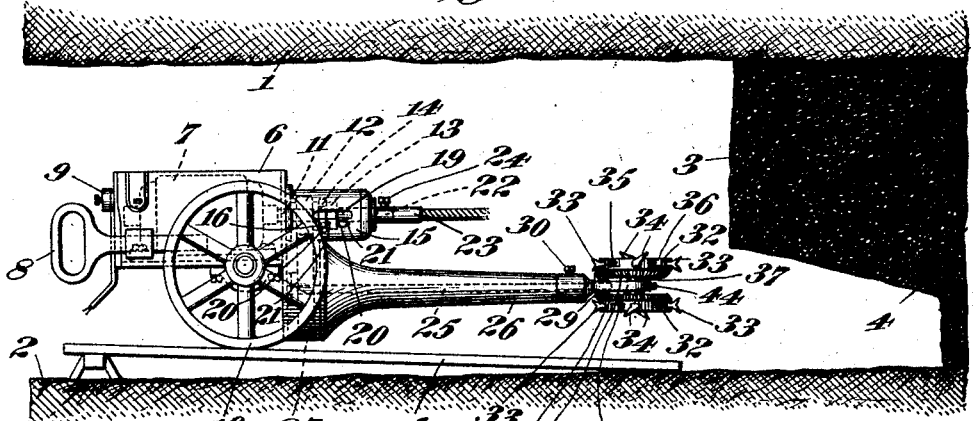
Inventor
Russell E. Booker
By Geo. E Thackray
Attorney Patented Feb. 9, 1926.

1,572,066

UNITED STATES PATENT OFFICE.

RUSSELL E. BOOKER, OF WINDBER, PENNSYLVANIA.

MINING MACHINE.

Application filed January 11, 1922. Serial No. 528,436.

*To all whom it may concern:*

Be it known that I, RUSSELL E. BOOKER, a citizen of the United States, and a resident of Windber, county of Somerset, and State of Pennsylvania, have invented certain new and useful Improvements in Mining Machines; and I do hereby declare the following to be a full, clear, and exact description of the invention, such as will enable others skilled in the art to which it appertains to make and use the same.

My invention relates to a mining machine which is adapted to cut or undercut any earthy or mineral material, either in mines, quarries, open cuts or elsewhere, but for the purpose of ease of description and illustration I will confine myself to its use in connection with a coal mine, and although my machine is adapted to be driven by any suitable motor, I will describe and show it herein driven by an electric motor with a switch control.

My invention in general consists of a machine carried by and balanced or partly balanced upon a pair of wheels mounted on an axle, the machine being provided with a pair of handles adapted to be grasped by the operator. The machine may be operated upon the floor or bottom of a mine, although it may preferably be mounted upon the usual inclined supporting board, affording a smooth surface slightly inclined downwardly toward the cutting, which thus provides a convenient support upon which it can be easily moved in any manner or direction. The operator, preferably in a sitting posture, feeds the machine to the work and to the cut to be made, by holding the handles and pushing the rotating cutting head of the machine into the material to be cut. The machine is provided with a driving motor of any kind, but in this case I illustrate it as an electric motor, and the machine is provided with an operating shaft driven by said motor, on the end of which shaft is a bevel pinion. The bevel pinion meshes with two bevel gear wheels which are arranged on a short shaft substantially at right angles to the operating shaft and said bevel gears are approximately parallel, and when driven by the pinion one of these will rotate in one direction while the other will rotate in the opposite direction. Mounted on each bevel gear wheel or formed integral therewith is a cutting head or disk provided with a plurality of tool holders adapted to receive and hold cutting bits of different shapes, which are revolved at the proper speed with the rotation of the bevel gears. On account of the fact that the two bevel gears rotate in opposite directions, the machine is balanced in operation and has little or no tendency to be pulled sidewise, as would be the case if only one of the cutting disks were used, or if both rotate in the same direction. This makes the machine very easy to handle and the backward or other thrust of the same is little or nothing, as I have found by actual experience that the operator can use this machine without the necessity of using a wooden chock block attached to his foot, as is customary with other machines and with reciprocating machines known as punchers. The operator can handle this machine very easily by his hands alone, but, if he so desires, he can place his foot against the wheel or other part of the machine to assist in holding or locating it, without any danger of hurting himself by the backward or other thrust.

The head of my machine is ordinarily arranged with the gear wheels horizontal and rotating in opposite directions parallel to each other, but I can also adjust the cutting head to any angle or to an angle of ninety degrees and thereby use the machine as a channeling machine to cut angularly or vertically instead of the usual substantially horizontal undercut. I also provide attachments on my machine adapted to drive a boring auger so as to provide a hole in the material to be won for inserting powder, dynamite or other cartridges therein to blow the material down after it has been undercut or undercut and sidecut.

My cutting disks are arranged substantially parallel to each other with bits projecting outwardly, upwardly and downwardly therefrom to thus make a clean, narrow cut and provide sufficient clearance for easy operation, without rubbing friction.

I have found by experience with the form of machine illustrated, that this produces much cleaner work in cutting the coal than other machines heretofore used, and the coal cut thereby is coarsely granular and not the usual fine powdered cuttings which are not so valuable.

My machine may be run at any convenient speed, but I have found by trial that one satisfactory speed is with the motor running about 1,900 revolutions per minute and the cutting head at about 275 revolutions per minute, but wish it understood these speeds may be varied to any extent to suit the desires or requirements.

Having thus given a general description of my invention, I will now, in order to make the matter more clear, refer to the annexed sheet of drawings, which form part of this specification, and in which like characters refer to like parts.

Figure 1 is a side elevation of my improved mining machine showing it located near the working face of the drift, heading, cross cut, or room with the undercut portion of the vein of coal excavated thereby, illustrating the application of my invention; Figure 2 is a vertical longitudinal sectional elevation through the cutting head, taken on the line II—II of Figure 3; Figure 3 is a horizontal sectional elevation through the cutting head taken on the line III—III of Figure 2; Figure 4 is a top view of one of the rotary cutting disks showing eight tools or bits mounted therein; Figure 5 is a central vertical longitudinal sectional elevation through the gear casings; Figure 6 is a horizontal longitudinal sectional elevation through the clutch gear casing; Figure 7 is an end elevation of the clutch gear mounted on the end of the motor shaft with the operating lever and appurtenances attached thereto, and Figure 8 is a side elevation of one of the offset cutting tools or bits.

Referring now to the characters of reference on the drawings:—1 is the top or roof of a coal mine; 2 the bottom or floor thereof; 3 represents the face of the coal seam; 4 is the undercut portion of the seam which is excavated by my machine, and although this is shown of considerable height I can, by lowering the machine, undercut to a considerable depth but of less height, so that more of the coal will be produced in the form of lumps; 5 is the support board of the machine, the outer end of which is mounted on a block or trestle as illustrated. The body of the machine is generally indicated as 6, provided with a motor 7 mounted in a casing having handles 8 on each side thereof and provided with electrical connections and a switch 9 for supplying current to the motor. The machine is mounted upon wheels 10 and the motor is provided with a main shaft 11. In a separate casing outside of the motor casing I provide a clutch gear 12, which is adapted to be moved into or out of mesh with the gear 27, which is mounted on and drives the operating shaft 25. The clutch gear 12 is provided with an annular collar 13, a groove 14 therein and an operating handle or fork 16 adapted to move the gear 12 into or out of mesh, the casing in which this portion is mounted being 15. In connection with the operating handle 16 I provide a pawl 17 and a spring 18 to lock the operating handle or fork 16 in the notches 20 and 21 formed in the slot 19 in the casing 15, which therefore holds the pinion 12 in or out of mesh with the gear wheel 27. In the outer end of the driving shaft I provide a socket 22, which is adapted to receive the connecting end of a flexible shaft 23 held therein by the set screw 24 and adapted to rotate a drill or other similar auxiliary apparatus. The main operating shaft for my mining machine is 25, which is mounted in a tubular casing 26, which may be either cylindrical, tapering or may be of any other shape or sections desired. At the end of the casing I mount a cutter head bracket 28, which is illustrated as of approximately triangular form with rounded angles, and on the end of the shaft 25 is mounted a bevel pinion 29. The bracket 28 is secured in place by the set bolt 30, and may be turned and secured at any angle as desired, whereby the cutting head may be horizontal, inclined or vertical. An opening 31 is provided in the bracket 28, through which the bevel pinion 29 may extend as illustrated, and this and the gears are also covered by a close fitting shield 46 to exclude cuttings from the moving parts. The cutting heads or disks are 32, which are mounted on or integral with the bevel gear wheels 45, and in these disks may be mounted different forms of cutting tools or bits, such as 33, which is a double pointed tool, or 34, which is an offset single edge cutting tool, being held in position by the set screws 35 with their head ends in the notches 36. By using different shapes of cutting tools the work is facilitated and ample clearance for the cutting head provided. Each cutting disk and its bevel gear wheel may be either integral or separate, and these are rotatably mounted upon a short shaft 37, which is provided with an opening 38, which is used as an oil reservoir, which, by means of the side outlets 39, feeds the oil to the bearings of the bevel gears and cutting disks. A washer 40 is provided at one end of the shaft 37 having a dowel pin 41 to secure it in place thereon and the oil reservoir is closed or opened by means of the cap screw 42. The cutter head bracket 28 is provided with a cylindrical opening 43 to receive the shaft 37, which is secured therein by means of the set screw 44.

The operation of my machine is as follows: When the clutch pinion 12 is in mesh with the gear 27 and the motor started, the bevel pinion 29 is revolved in a clock-wise direction, as viewed from the operator's position, and the lower cutting disk will revolve in a clock-wise direction as viewed from above, and the upper cutting disk will revolve in the opposite direction. This being the case as the machine is fed into its work, the cutting disks will strike opposite blows or make opposite cuts substantially simultaneously, which thereby balances the cutting head and eliminates any tendency on the part of the machine to vibrate or to jump in any direction. This makes the machine very easy to control and steady in its operation. In the normal position the cutting heads are parallel and substantially horizontal or slightly inclined therefrom in order to make an undercut, but if it is desired to make a side cut or shearing cut, the set screw 30 is loosened, the cutting heads rotated to the proper extent, the set screw retightened, and the machine can be used for channeling or side cutting, and when the cutting is done this requires less powder or other explosives to shoot the coal down and provides a larger proportion of lumps and a better quality of merchantable coal, besides which such shearing is required by law in narrow places to prevent blownout shots with their attendant danger.

On account of their lack of balance the operation of prior machines is not so easy, and it is difficult to hold them in the coal on account of their tendency to kick back or otherwise, which requires the use of foot blocks or other holders, and this is particularly true of those of the punching type. Another advantage with this type of machine is that it is almost dustless and the cuttings are of large granular size, very similar to those produced by hand-pick work.

On account of the construction of the machine it is several hundred pounds lighter than the lightest known air machine and practically six hundred pounds lighter than any other electrical machine in use.

I have also found it sufficient to use a standard two-horse power motor for driving my machine, and the apparatus is convenient and easy to manufacture, is easily lubricated, and contains few parts and has no complicated electrical controllers or resistance to give trouble, besides which it costs very little for power, and on account of its compactness and lightness is easily transported from one place to another.

I have found by actual practice with my machine that I can cut a heading into the coal ten feet wide to a depth of four feet in less than fifteen minutes, and have made a cross cut nine feet wide to a depth of three and one-half feet in less than nine minutes. A similar cross cut was made with this machine on what is known as a "roll," varying from nothing to about eighteen inches in height and in a hard sulphur band that extended across it from one inch to three inches thick, requiring one man thirty minutes, while it would require two men about two hours to do the same work by the usual hand methods.

Although I have shown and described my invention in considerable detail, I do not wish to be limited to the exact and specific details thereof, as shown and described, but may use such modifications in, substitutions for, or equivalents thereof as are embraced within the scope of my invention, or as pointed out in the claims.

Having thus described my invention, what I claim and desire to secure by Letters Patent is:

1. In a mining machine of the character described, a cutting head bracket, a short shaft secured therein, a pair of bevel gears rotatably mounted on opposite ends of said shaft, said shaft being provided with an internal oil reservoir, a closure therefor, and openings leading therefrom to the bearings of said bevel gears on said shaft.

2. In a mining machine of the character described, a casing with an electric motor therein, the motor shaft extending outwardly therefrom and provided with a slidable pinion adapted to drive a coal cutting mechanism when in gear therewith, said shaft also having a socket at its outer end, and means for securing a drill shaft therein.

3. In a mining machine, a pair of cutting disks each provided with a bevel gear substantially parallel and spaced apart, a bevel pinion adapted to mesh with each gear and rotate them in opposite directions, a plurality of bits mounted in the disks and adapted to project outwardly therefrom, a closely fitting shield surrounding and enclosing the gear teeth and moving parts, whereby dirt and dust is excluded therefrom, a shaft on the opposite ends of which said cutting disks are directly and rotatably mounted, a bracket directly supporting and secured to said shaft intermediate of said disks, the inner end of said bracket being tubular, a tubular casing in which said operating shaft is mounted and on the end of which the tubular inner end of said bracket is rotatably mounted, and means for securing said bracket in position on the tubular casing at any desired angle.

4. In a mining machine, a wheeled cart, a motor mounted on said cart above the axis of the wheels of the same and extending rearwardly from said axis, a casing mounted on the cart forwardly of said axis, the shaft of said motor extending into said casing, a tubular casing carried by the cart, extending forwardly from the same and having its axis arranged below the axis of the cart wheels, a shaft in the tubular casing, means for driving the last mentioned shaft from the motor shaft, a pair of cutting disks rotatably mounted at the forward end of the tubular casing, and means for driving said disks from the shaft in the tubular casing.

In witness whereof I hereunto affix my signature.

RUSSELL E. BOOKER.